Figure 1:
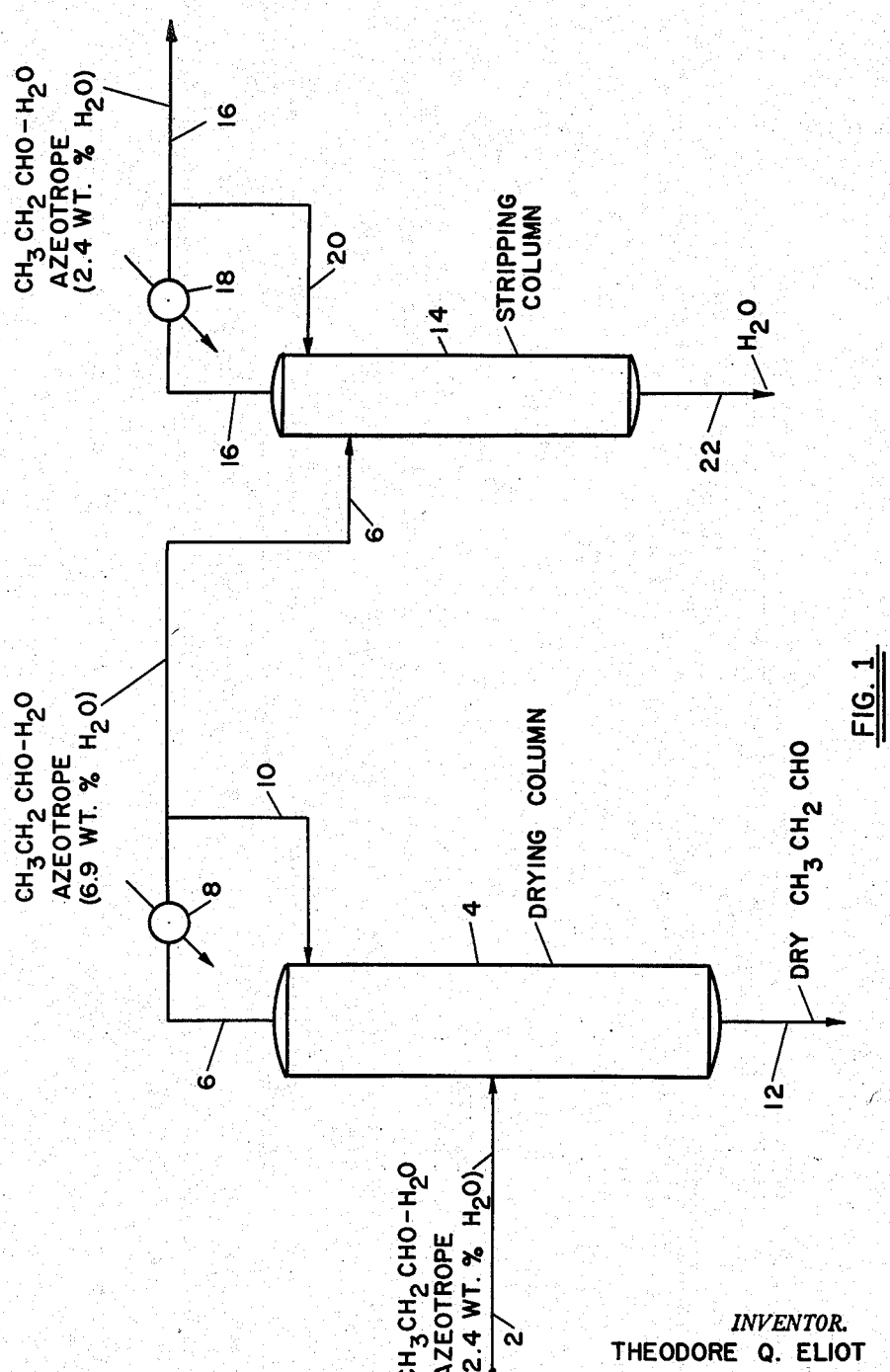

Nov. 11, 1952 — T. Q. ELIOT — 2,617,756
PROCESS FOR RECOVERY AND PURIFICATION OF PROPIONALDEHYDE
Filed May 20, 1950 — 2 SHEETS—SHEET 2

INVENTOR.
THEODORE Q. ELIOT
BY Arthur M. Ilroy
ATTORNEY

Patented Nov. 11, 1952

2,617,756

UNITED STATES PATENT OFFICE 2,617,756

PROCESS FOR RECOVERY AND PURIFICATION OF PROPIONALDEHYDE

Theodore Q. Eliot, Tulsa, Okla., assignor to Stanolind Oil and Gas Company, Tulsa, Okla., a corporation of Delaware Application May 20, 1950, Serial No. 163,208

10 Claims. (Cl. 202—42)

The present invention relates to the purification and recovery of propionaldehyde from various aqueous mixtures thereof. More particularly, it pertains to a method for the purification and recovery of propionaldehyde from aqueous solutions thereof and from aqueous mixtures of various oxygenated organic compounds, which method is based upon the discovery that a water-propionaldehyde azeotrope exists and upon the further discovery that by distillation of such mixtures under increased pressures, the concentration of water in the propionaldehyde-water azeotrope can be increased.

Commercial propionaldehyde, which is purified by distilling an aqueous solution thereof at atmospheric pressure, contains from about 1.5 to 2.5 weight per cent water. Such a product, however, has met with considerable objection from those in the industry owing to its pronounced corrosive properties. Even when shipped in aluminum containers it has been noted that the product is highly contaminated with the metal and requires further purification before it can be used. Also, propionaldehyde has been found to be extremely difficult to separate from various oxygenated organic impurities normally produced during the synthesis of propionaldehyde. Thus, for example, in the product water from modified Fischer-Tropsch synthesis plants capable of producing 6,000 to 7,000 barrels per day of hydrocarbons boiling in the gasoline range, there is obtained approximately 5,000 to 10,000 pounds per day of propionaldehyde. It is impossible, however, to separate this propionaldehyde fraction in pure form from the aforesaid aqueous product mixture by ordinary fractional distillation because of the presence of numerous close boiling impurities, the most troublesome of which is acetone boiling at 56.2° C.

It is, accordingly, an object of my invention to provide a method for obtaining pure anhydrous propionaldehyde from aqueous mixtures thereof. It is a further object of my invention to provide a process whereby propionaldehyde can be readily separated from aqueous mixtures of oxygenated organic compounds boiling close to the boiling point of propionaldehyde or which form azeotropes boiling near the boiling point of propionaldehyde. It is another object of my invention to separate propionaldehyde from aqueous mixtures of various oxygenated organic compounds by effecting distillation of such mixtures at superatmospheric pressure.

I have now found, contrary to that which would normally be expected, that propionaldehyde, which boils at 48.8° C., forms a homogeneous azeotrope with water boiling at 48° C. (atmospheric pressure) and contains 2.4 weight per cent water. I have further found that by increasing the pressure at which such aqueous propionaldehyde mixtures are distilled, the water content of the azeotrope is very substantially increased. Thus, the table appearing below demonstrates the extent to which the concentration of water can be increased by application of pressures up to 6 atmospheres.

Table

| Absolute Pressure, Atmospheres | Wt. Percent Water in Distillate | Vapor Temperature, °C. |
|---|---|---|
| 1 | 2.4 | 48 |
| 2 | 3.2 | 69 |
| 4 | 5.0 | 94 |
| 6 | 6.9 | 111 |

At higher pressures azeotropes richer in water are obtained, however, excessive pressures are not ordinarily desirable because of high equipment costs. Generally, pressures of from about 3 to about 10 atmospheres will be found satisfactory.

Utilizing the above phenomenon, it is now possible to obtain propionaldehyde in substantially anhydrous form by means of a relatively simple distillation procedure either from wet propionaldehyde alone or from aqueous mixtures of close boiling oxygenated organic impurities. Thus, the water present in the propionaldehyde-water azeotrope obtained at atmospheric pressure can be substantially completely removed from the aldehyde in accordance with the procedure illustrated in Figure 1 wherein, for example, a feed stream, 100 pounds of aqueous propionaldehyde consisting of 2.4 pounds of water and 97.6 pounds of propionaldehyde is introduced into column 2 through line 4. Distillation of the feed is effected at a temperature of 111° C. and under a pressure of 6 atmospheres (absolute) and the azeotrope of propionaldehyde and water is taken overhead through line 6 and condenser 8, a portion thereof being recycled to column 4 through line 10 as reflux. A dry propionaldehyde bottoms weighing 65.2 pounds is withdrawn through line 12. The overhead withdrawn through line 6 and consisting of 32.4 pounds of propionaldehyde and 2.4 pounds of water is then introduced into column 14 which is operated at a pressure of 1 atmosphere (absolute). Under these conditions a propionaldehyde-water azeotrope consisting of 32.4 pounds of propionaldehyde and 0.8 pound of water is taken overhead through line 16 and condenser 18 and, if desired, may be recycled to column 4 for further water removal. A small portion of this stream is returned to column 14 through line 20 as reflux. The bottoms which consists of 1.6 pounds of water is withdrawn through line 22. With batchwise operation as shown in Figure 1 it is possible to obtain 90 per cent yield of anhydrous propionaldehyde in three batch distillations. If, as suggested above, it is desired to operate the process continuously by recycling the distillate from line 16 to column 4, yields of the order of 97 per cent can be achieved.

Figure 2:
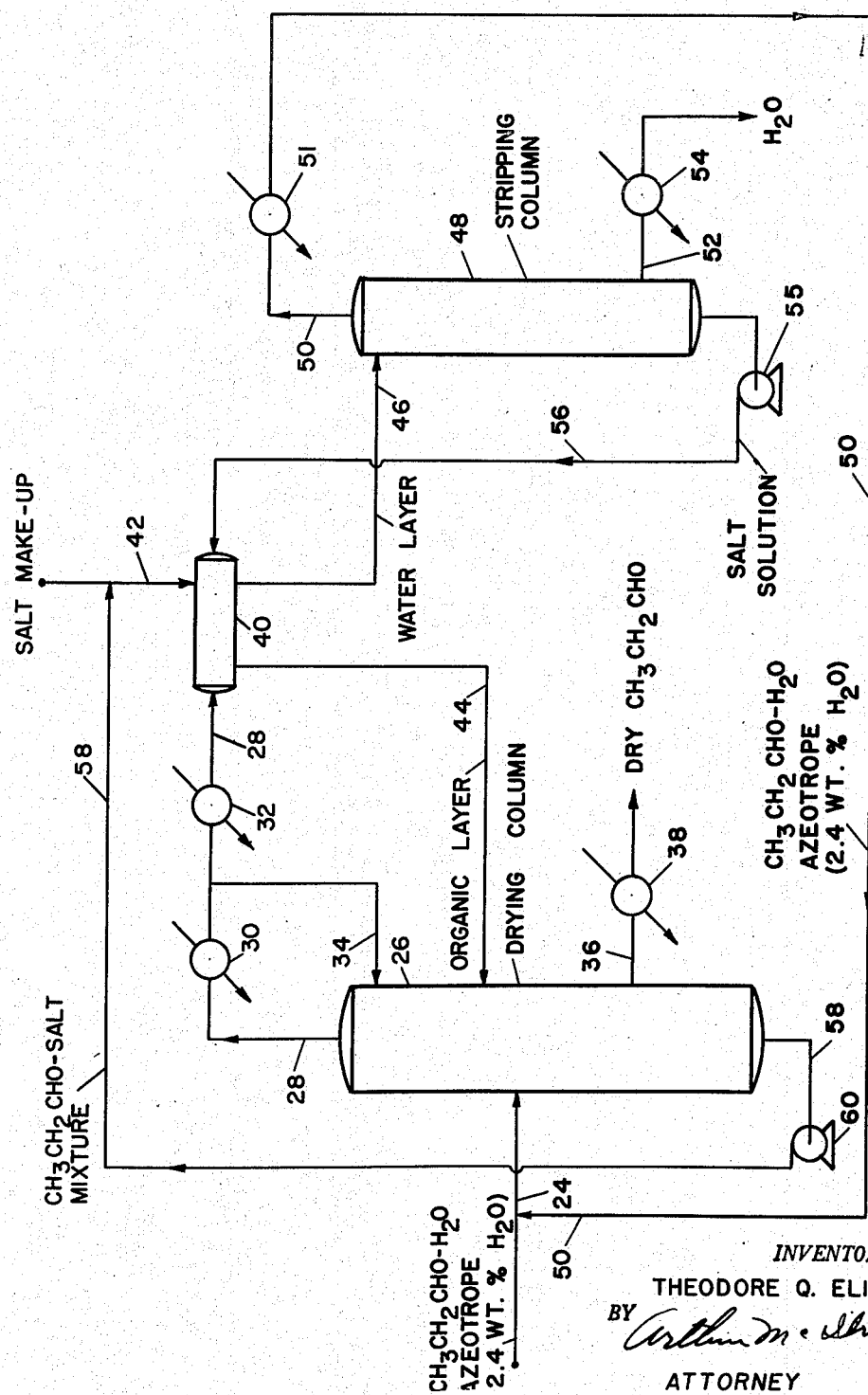

Figure 2 represents still another method for the removal of water from the propionaldehyde-water azeotrope involving the principles of the invention herein set forth. Thus, a propionaldehyde-water azeotrope obtained at atmospheric pressure and containing 2.4 weight per cent water is introduced through line 24 into drying column 26 which is operated at a pressure of 4 atmospheres (absolute) and at a temperature of 94° C. The resulting azeotrope which contains 5 weight per cent water is withdrawn through line 28, condenser 30, and cooler 32 and partially recycled to column 26 through line 34 as reflux. A dry bottoms of propionaldehyde is withdrawn from column 26 as a side stream through line 36 and condenser 38. The bulk of the overhead stream, however, is introduced into mixing tank 40 where the distillate is contacted with a saturated solution of any of the well known salting out agents added through line 42. The resulting layer of propionaldehyde is returned to column 26 through line 44 while the lower aqueous layer containing salt is withdrawn through line 46 and introduced into stripping column 48 which is operated at atmospheric pressure. An azeotrope of propionaldehyde and water is removed overhead through line 50 and condenser 51 by employing a temperature of 48° C. in column 48. This distillate is recycled through line 50 to line 24 where it is combined with the feed to column 26. Water is withdrawn from column 48 as a side stream through line 52 and condenser 54 while a concentrated salt solution is withdrawn from the bottom of column 48 and returned to tank 40 through pump 55 and line 56. Salt entrained in the propionaldehyde layer introduced into column 26 through line 44 is returned to tank 40 via line 58, pump 60, and salt make-up line 42.

It will be apparent that the procedures illustrated by Figures 1 and 2 constitute convenient and practical methods for procuring propionaldehyde in anhydrous form and thereby obtain a product free from the objections raised with respect to former commercial propionaldehyde stocks.

The discovery that propionaldehyde forms an azeotrope with water and that the water content thereof increases with increasing pressure can also be made use of to advantage in separating propionaldehyde from aqueous solutions of acetone. Thus, at atmospheric pressure, acetone forms no azeotrope with water and boils at 56.2° C. while the propionaldehyde-water azeotrope is formed at 48° C., a difference of only 8.2° C. As a result, it is extremely difficult to obtain acetone from such mixtures free from propionaldehyde. Although two compounds boiling this close together conceivably could be separated by the use of special fractionating columns with a sufficient number of theoretical plates, the expense of such equipment for this type of operation is prohibitive. By application of my discovery to this problem, I am able to separate propionaldehyde from aqueous acetone solutions by affecting the operation in ordinary distillation columns at increased pressures. For example, at pressures of 50 p. s. i. g. the propionaldehyde-water azeotrope boils at 97.4° C. while acetone under the same pressure forms an azeotrope with water boiling at 109.2° C., a difference of 11.2° C. A further spread in the boiling points of these two azeotropes, of course, can be achieved by means of additional pressure. Accordingly, it will be apparent that efficient separation of propionaldehyde from aqueous acetone can be obtained at higher pressures and also that a substantial savings in the size of fractionating columns and auxiliary equipment employed can be achieved when effecting such separation in accordance with the process of my invention.

From the foregoing description it is evident that as a result of the teachings of the present invention, it is now possible to recover propionaldehyde in anhydrous form from various mixtures containing this compound in an efficient and simple manner. Furthermore, by the process of my invention, propionaldehyde may be recovered in the form of its water azeotrope from mixtures of compounds or azeotropes thereof which boil sufficiently close to the propionaldehyde-water azeotrope to render such a separation extremely difficult or impossible by means of normal distillation methods.

It is to be pointed out further that while atmospheric pressure was employed in the processes illustrated by Figures 1 and 2, subatmospheric pressures may be used. However, inasmuch as the propionaldehyde-water azeotrope boils at 48° C. under 760 mm. pressure, the utilization of appreciably lower pressures is considered impractical because of the refrigeration that would be required to condense the propionaldehyde distillate.

What I claim is:

1. In a process for the recovery of propionaldehyde from aqueous mixtures thereof, the step which comprises subjecting said aqueous mixture to distillation under superatmospheric pressure to obtain an overhead of propionaldehyde and water in the form of an azeotrope containing substantially in excess of 2.4 weight per cent water and a bottoms of substantially anhydrous propionaldehyde.

2. The process of claim 1 in which the distillation is effected under a pressure of from about 3 to about 10 atmospheres.

3. In a process for the recovery of propionaldehyde from aqueous mixtures thereof, the steps which comprise subjecting said aqueous mixture to distillation under superatmospheric pressure to obtain an overhead of propionaldehyde and water in the form of an azeotrope containing substantially in excess of 2.4 weight per cent water and thereafter subjecting the distillate thus obtained to a second distillation operation at reduced pressure to yield an overhead fraction of propionaldehyde and water in which the water concentration in said overhead fraction is less than in said distillate.

4. In a process for the preparation of anhydrous propionaldehyde from an aqueous mixture thereof, the steps which comprise subjecting an azeotropic mixture of propionaldehyde and water obtained at atmospheric pressure to distillation at a pressure of from about 3 to about 10 atmospheres to obtain overhead a fraction containing propionaldehyde and water, the water being present in increased concentrations over that in which it was present in said azeotrope of propionaldehyde and water obtained at atmospheric pressure, and withdrawing a substantially anhydrous bottoms of propionaldehyde.

5. In a process for the preparation of anhydrous propionaldehyde from an aqueous mixture thereof, the steps which comprise subjecting an azeotropic mixture of propionaldehyde and water obtained at atmospheric pressure to distillation at a pressure of from about 3 to about 10 atmospheres to obtain overhead a fraction containing propionaldehyde and water, the water being present in increased concentrations over that in which it was present in said azeotrope of propionaldehyde and water, subjecting the overhead fraction thus obtained to distillation at atmospheric pressure to yield a propionaldehyde-water azeotrope containing about 2.4 weight per cent water, and returning said azeotrope to said azeotropic mixture in said first distillation step.

6. In a process for the preparation of anhydrous propionaldehyde from an aqueous mixture thereof, the steps which comprise subjecting an azeotropic mixture of propionaldehyde and water obtained at substantially atmospheric pressure to distillation at superatmospheric pressure to yield an overhead fraction containing propionaldehyde and water, the water being present in increased concentration over that in which it was present in said azeotrope of propionaldehyde and water obtained at atmospheric pressure, withdrawing a substantially anhydrous bottoms of propionaldehyde, subjecting said overhead fraction of propionaldehyde and water to a salting out operation whereby the propionaldehyde and water form two phases, returning the resulting propionaldehyde layer to the initial distillation operation, withdrawing the lower aqueous layer and subjecting it to distillation at a lower pressure than employed in said first distillation step to obtain overhead a propionaldehyde - water fraction containing less water than was present in the overhead from said first distillation, and recycling the resulting propionaldehyde-water fraction of decreased water content to said first distillation step.

7. In a process for the preparation of anhydrous propionaldehyde from an aqueous mixture thereof, the steps which comprise subjecting an azeotropic mixture of propionaldehyde and water obtained at atmospheric pressure to distillation at a pressure of from about 3 to about 10 atmospheres to yield an overhead fraction containing propionaldehyde and water, the water being present in increased concentration over that in which it was present in said azeotrope of propionaldehyde and water obtained at atmospheric pressure, withdrawing a substantially anhydrous bottoms of propionaldehyde, subjecting said overhead fraction of propionaldehyde and water to a salting out operation, returning the resulting propionaldehyde layer to the initial distillation operation, withdrawing the lower aqueous layer and subjecting it to distillation at atmospheric pressure to obtain overhead a propionaldehyde-water fraction containing less water than was present in the overhead from said first distillation, and recycling the resulting propionaldehyde-water fraction of decreased water content to said first distillation step.

8. A method for inhibiting the corrosive and other undesirable properties of propionaldehyde derived from aqueous solutions thereof which comprises subjecting said propionaldehyde to distillation under superatmospheric pressure to obtain an overhead of propionaldehyde and water in the form of an azeotrope containing substantially in excess of 2.4 weight per cent water and a bottoms of substantially anhydrous propionaldehyde.

9. The process of claim 4 in which the azeotropic mixture of propionaldehyde and water is subjected to distillation at a pressure of about 6 atmospheres (absolute).

10. The process of claim 7 in which the azeotropic mixture of propionaldehyde and water is subjected to distillation at a pressure of about 4 atmospheres (absolute).

THEODORE Q. ELIOT.

REFERENCES CITED

The following references are of record in the file of this patent:

UNITED STATES PATENTS

| Number | Name | Date |
| --- | --- | --- |
| Re. 17,157 | Bogin | Dec. 11, 1928 |
| 1,446,874 | Brooks | Feb. 27, 1923 |
| 1,676,700 | Lewis | July 10, 1928 |
| 1,905,290 | Horsley | Apr. 25, 1933 |
| 1,911,832 | Lewis | May 30, 1933 |
| 2,160,064 | Eversole | May 30, 1939 |
| 2,324,255 | Britton et al. | July 13, 1943 |
| 2,485,329 | Steele et al. | Oct. 18, 1949 |

OTHER REFERENCES

Young, Distillation Principles and Processes, published 1922 by Macmillan and Company, Ltd., St. Martins St., London, pages 59, 60 and 61.